Dec. 15, 1964 C. W. MUSSER 3,161,081
ROLLING WEDGE DRIVE
Filed April 11, 1962 4 Sheets-Sheet 1

Inventor
C. Walton Musser
By his Attorney

Dec. 15, 1964  C. W. MUSSER  3,161,081
ROLLING WEDGE DRIVE
Filed April 11, 1962  4 Sheets-Sheet 3

(a)

(b)

(c)

United States Patent Office 3,161,081
Patented Dec. 15, 1964

3,161,081
ROLLING WEDGE DRIVE
C Walton Musser, Palos Verdes Estates, Calif., assignor to United Shoe Machinery Corporation, Boston, Mass., a corporation of New Jersey
Filed Apr. 11, 1962, Ser. No. 186,759
15 Claims. (Cl. 74—640)

The present invention relates to rolling wedge drives in which rotary motion is produced by circumferentially progressing the inner section of two cooperating helices by a traveling wave produced by a rotary wave generator.

A purpose of the invention is to produce low ratio or medium ratio rotary-to-rotary speed reducers or increasers.

A further purpose is to produce a low or medium ratio speed reducer in which all of the parts are coaxial.

A further purpose is to produce a speed reduction in a single step using a relatively simple construction.

A further purpose is to obtain a high degree of linearity between the input and the output of a speed reducer, so that the device is relatively free from rotary vibrations of the output.

A further purpose is to produce a drive which has parallel sliding action as in a worm drive, but with a large rolling component which markedly increases the overall efficiency compared to a worm drive.

A further purpose is to produce a drive unit whose efficiency is high enough to permit it to be used as a speed increaser or a speed reducer.

A further purpose is to provide a gear reduction unit of low or medium ratio which has relatively low flexural stresses.

A further purpose is to provide a drive having cooperating teeth which operate relatively quietly.

A further purpose is to permit adjustment of the backlash of an output shaft by adjustment of the traveling wave on the wave generator, permissibly increasing the pressure of the wave generator as required.

A further purpose is to rotate the output shaft by two diametrically opposed sets of teeth to produce a couple of forces.

In the drawings I have chosen to illustrate a few only of the numerous embodiments by which the invention may appear, selecting the forms shown from the standpoints of convenience in illustration, ease in operation and clear demonstration of the principles involved.

FIGURE 8a is an axial section, FIGURE 8b is a section taken perpendicular to the helix angle and FIGURE 8c is a transverse section taken perpendicular to the axis.

FIGURE 9a is an axial section, FIGURE 9b is a section taken perpendicular to the helix angle and FIGURE 9c is a transverse section taken perpendicular to the axis.

Figure 1:
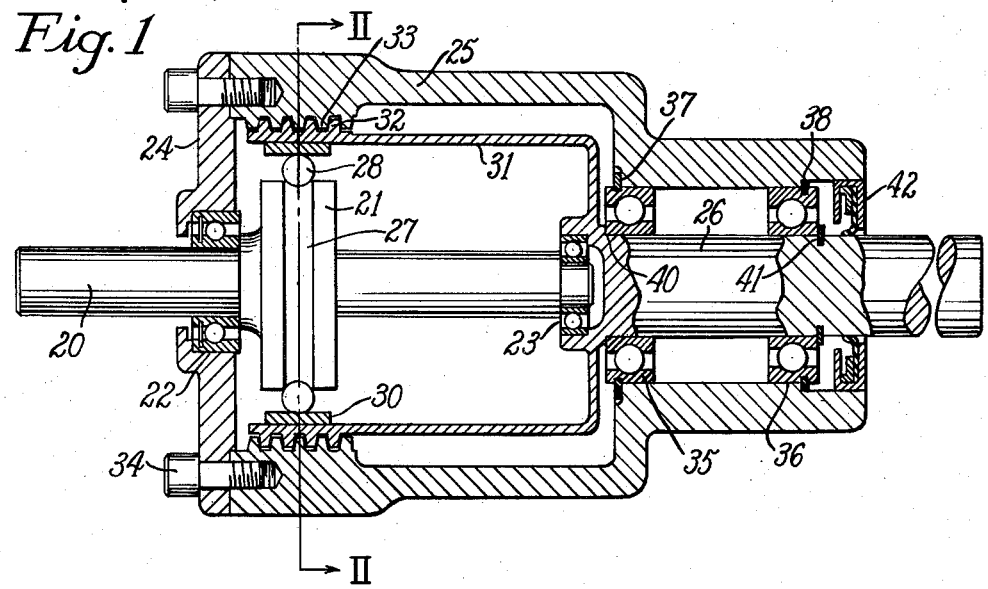
FIGURE 1 is an axial section illustrating a mechanical arrangement of the cooperating parts in a device of the invention in which a reaction element is on the outside and a flexible wedge carrier is on the inside.

In my United States Patent No. 2,906,143, granted September 19, 1959, for Strain Wave Gearing, I illustrate a rotary-to-rotary drive in which teeth generally of the character of gear teeth transmit a wave to produce relative rotation. This device is effective for high ratios, but where low ratios are involved it is often not practical because the stresses are excessively high when a metallic wave carrier is employed as later explained.

My United States Patent No. 2,943,508, granted July 1960, for Strain Wave Gearing—Linear Motion, is primarily concerned with producing linear motion by transmitting a wave around one set of thread-like surfaces cooperating with another such set. In this patent, column 19, line 64, to column 20, line 6, I mention the possibility of obtaining rotary output. In this device as originally contemplated, I had in mind using relatively low helix angles of the type commonly encountered in screw threads. To obtain rotary motion with helices of these proportions it requires coefficient of friction values so low as to be economically impractical.

I have more recently discovered as later explained more in detail, that by utilizing relatively high helix angles the coefficient of friction becomes increasingly less important. With helix angles larger than 10°, for example, I can obtain an effective rotary-to-rotary drive which will produce smaller ratios with much lower deflections in the wedge carrier than would be necessary in the device of my United States Patent No. 2,906,143 above referred to. Thus, it is possible to use steel or other metallic wedge carriers with good service life in low ratio rotary-to-rotary devices.

The operation of the device of the invention can be best understood by considering it as a linear actuator according to my United State Patent No. 2,943,508, but in which the output element is locked against linear motion and is free to rotate.

Unlike the prior practice, however, the helix angles are relatively large, for practical applications exceeding 10°.

Under these conditions where the device is operating as a rotary-to-rotary drive, the cooperating wedges and thread-like reaction elements will slide relatively to one another and rotary motion is produced. The tooth form and the deflection can follow the practice with the linear actuator of my Patent No. 2,943,508.

When helix surfaces are used, the actual force produced on a tooth or thread is at right angles to the surface. As a consequence, this force may be viewed as two coordinate vectors. Under certain conditions, either axial motion or rotary motion can be produced by this action, but in the present case I am concerned with rotary aspects. Appropriate choice of parameters makes possible a rotary-to-rotary reducer of a much lower ratio than could be acomplished by the rotary-to-rotary version of harmonic drive as described in my United States Patent No. 2,906,143 because considerably lower flexural stresses are involved.

In a rotary-to-rotary harmonic drive of the character of my United States Patent No. 2,906,143, the flex stress increases as the ratio decreases. This is true because the ratio is equal to the diameter of the driven elements divided by the total height of the traveling wave, which is usually a sine wave. Thus when the wave carrier is made with a material having a high modulus of elasticity such as steel it becomes impractical to produce a speed reducer of low ratio following my United States Patent No. 2,906,143. By arranging the cooperating teeth so that their action is along a helix I find that the deflection in the wedge carrier can be markedly reduced for any given ratio. However, in order to produce the end effect, it is necessary that sliding takes place along the helix. It is actually this sliding which permits the deflection to be much lower than would be indicated by the ratio formula for harmonic drive.

In FIGURE 1 an input shaft 20 is shown integral with the wave generator 21 for the purposes of simplicity only. It will, of course, be evident that if desired the wave generator 21 can be a separate part from the shaft and any one of a variety of different wave generators can be used as described in my United States Patent No. 2,906,143 above referred to. The wave generator can have rolling elements which are balls or rollers of any desired configuration, and the rolling elements can be of uniform size with an elliptoidal inner race or they can be of variable size acting as a planetary system. Merely for the purposes of illustration a wave generator is shown having an elliptoidal race which upon rotation will produce a traveling sine wave.

While the elliptoidal form is shown, it will be understood that the wave generator can have more than two lobes if desired. For example, it may be of a trianguloid or three-lobed version if desired.

The input shaft 20 and its wave generator 21 are mounted on two input shaft bearings 22 and 23. The bearing 22 is mounted in cover 24 of housing 25, and the bearing 23 functions as a spigot bearing in the end of concentric output shaft 26.

Figure 2:
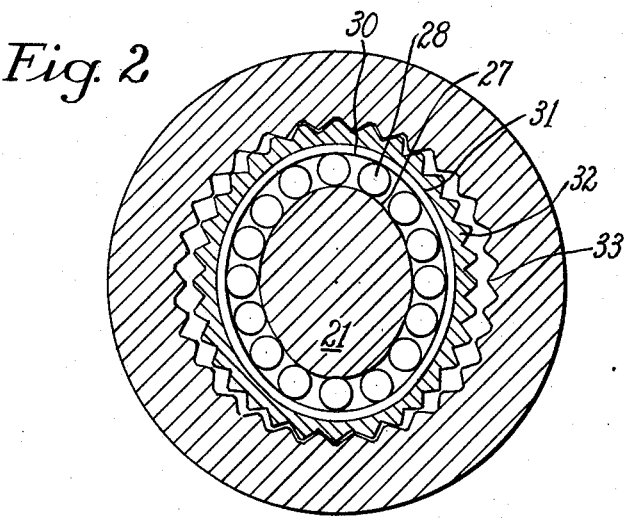
FIGURE 2 is a transverse section of FIGURE 1, taken through the center of the wave generator on the line II—II.

The wave generator 21 is composed of an inner raceway 27 which in the particular form is elliptoidal in shape as shown in FIGURE 2. Running in this raceway 27 are rolling elements 28 here shown as balls of uniform size. Surrounding the rolling elements 28 is an outer raceway 30 which as shown is deflected into an elliptoidal shape both on the inside and the outside.

As in harmonic drive as described in my U.S. Patent 2,906,143, the outer raceway 30 fits the balls 28 sufficiently close so that the elliptoidal shape of the inner race 27 is transferred through the rolling elements 28 to the outer raceway 30. Thus although the outer raceway is originally made circular, it is deflected into the elliptoidal shape. The outer raceway 30 fits closely within flexible wedge carrier 31 which surrounds the wave generator and is deflected into the elliptoidal form.

The flexible wedge carrier 31 in this form is essentially cup shape and is shown for convenience as integral with the output shaft 26. This integral form is shown for simplicity purposes only and is not intended to imply that the flexible wedge carrier 31 must be of cupped form. The flexible wedge carrier as shown in my U.S. Patent 2,906,143 may be tubular and splined fast to the output shaft or it may be fastened to the output shaft by any other appropriate means.

The flexible wedge carrier 31 has thread-like teeth or wedges 32 surrounding the lip of the end of the cup. These teeth at the major axis of the elliptoid combine with cooperating teeth or thread-like reaction elements 33 which are in a circular set as shown in FIGURE 2 around the inside of the housing 25.

While the form shown illustrates the rigid set of teeth 33 on the outside and the flexible set of teeth 32 on the inside, it will be evident by referring to my patents above referred to, either can be on the inside or on the outside with the cooperating thread-like surfaces or teeth on the adjoining periphery.

While the thread-like teeth or wedges 32 cooperate with the reaction elements 33 at the major axis of the elliptoid, I have previously explained (U.S. Pat. 2,943,508) that the teeth are not in contact at the major axis. At the major axis the teeth are traveling from contact with one side of the cooperating set to contact with the other side. Strictly speaking the teeth at the major axis are the most fully radially engaged but are not in actual contact on either side. In the device shown the actual contact points for each lobe of the wave generator are approximately 22 degrees before and after the major axis. The exact angle of the location at which these teeth are in contact is a function of the tooth angle in relation to the height of the deflection wave.

The housing cover 24 is held in place on the housing 25 by a series of cap screws 34.

The output shaft 26 is journalled on two output shaft bearings 35 and 36. These bearings are axially positioned in the housing by bearing snap rings 37 and 38, and the output shaft 26 is axially positioned in these bearings between a shoulder 40 and a snap ring 41. At the end of the housing there is a lubrication seal 42 and the input bearing 22 has a suitable lubrication seal within the bearing. These two seals retain lubricant within the housing.

Both the wedges 32 on the wedge carrier and the thread-like reaction surfaces 33 have a helix angle. These wedges and thread-like reaction surfaces have a difference in helix angle caused by a difference in the number of "starts" or leads per 360°, and, a difference in pitch diameter. Normally both helices will be of the same hand and have an angle of the approximate same magnitude. However, in some instances it may be desirable to have the helices of different hand for a specialized very low ratio application.

The difference in the number of "starts" or leads per 360° between the wedges 32 and the thread-like reaction surfaces 33 equals the number of lobes on the wave generator or is a multiple thereof. Thus if the number of lobes on the wave generator is 2, the difference in the number of "starts" or leads per 360° will be 2, 4 etc.

It will be evident that the thread-like reaction surfaces 33 in the form of FIGURES 1 and 2 are stationary while the output is free to rotate but locked against linear motion.

By the present invention it is possible by changing the relative relations of the helix angles of the two cooperating surfaces to obtain an output which is in the opposite direction from the input or in the same direction as the input. This has the advantage that the frictional drag of the input can be made to assist or to detract from the output power as desired in the particular instance.

In FIGURE 1 it will be seen that the rotation of the input shaft 20 will cause a wave to be transmitted around the end of the flexible wedge carrier 31 and causes the intersection point between the two helices (one on the wedge carrier and the other on the thread-like reaction elements) to progress circumferentially. Since the flexible wedge carrier is not free to move axially, the flexible wedge carrier will rotate as its wedges 32 circumferentially slide on the thread-like reaction surfaces 33. This in turn causes rotation of the output shaft 26.

By using a helix angle on the driven element that is larger than 10 degrees it is possible to economically and practically operate at lower ratios and still have lower flexural stresses in the wedge carrier.

FIGURE 2 shows the wave generator in cross section. Here it will be seen that the inner raceway 27 is elliptoidal in shape and is surrounded by the rolling elements 28. The outer raceway 30 surrounding the rolling element 28 has been deflected to the elliptoidal shape of the inner raceway 27 and this outer raceway 30 in turn causes the flexible wedge carrier 31 to deflect into the elliptoidal shape. The thread-like teeth or wedges 32 on the end of the flexible wedge carrier 31 have a relatively large pressure angle. It can be seen in FIGURE 2 that there is a marked difference betwen the character of these teeth and the character of the teeth used in harmonic drive (U.S. Patent No. 2,906,143), wherein the height of the deflection wave for an elliptoidal contour would use a 30° pressure angle. If the teeth of the device of the present invention which, for the example outlined herein, have a pressure angle of −65° 53′ and −67° 30′ were used in the usual rotary-to-rotary harmonic drive, it is questionable whether the device would be practical because of the steep cam angle.

The teeth or wedges 32 have in general the same tooth form or shape as the thread-like reaction elements 33 and cooperate and are in contact with the thread-like reaction surfaces 33 which are integral with the inside of the housing 25. As already explained, the wedges are in contact with the reaction surfaces at each side of the major axis and this is the point at which the wedges are actually slipping over the thread-like reaction surfaces.

Figure 3:
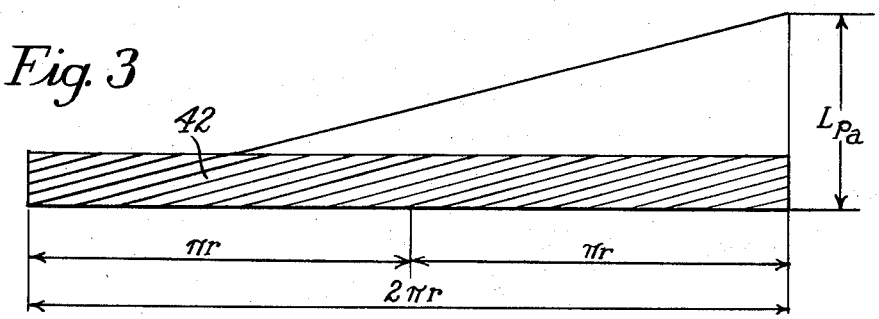
FIGURE 3 is a developed view of wedge carrier teeth to illustrate the approximate helix angle which is important in the present invention.

FIGURE 3 shows the relationship of the radius to the helix angle. I here show the wedges developed at 42 with the circumference being laid out on the base and the number of leads $L_{p_a}$ being laid out vertically. This shows that the axial displacement of a tooth in 360° is equal to the number of thread "starts" or leads times the axial pitch. This is the distance that one tooth progresses in one revolution. The helix angle is then the tangent, or the axial distance that one tooth traverses in one revolution, $L_{p_a}$, divided by the circumference of one revolution at the pitch line which is equal to $2\pi r$.

In the following discussion the following symbols are used:

$D_f$=the pitch diameter of the thread-like teeth or wedges 32.
$D_s$=the pitch diameter of the thread-like reaction surfaces 33.
$d$=the difference between $D_s$ and $D_f$.
$L_f$=the number of starts or leads in 360° of the teeth or wedges 32.
$L_s$=the number of leads on the thread-like reaction surfaces 33.
$p_a$=the aixal pitch between teeth.
$p_p$=the pitch between teeth perpendicular to the helix angle.
$P_c$=the circumferential pitch between teeth.
$\phi_f$=the helix angle of the teeth or wedges 32.
$\phi_s$=the helix angle of the thread-like reaction surfaces 33.

Figure 4:
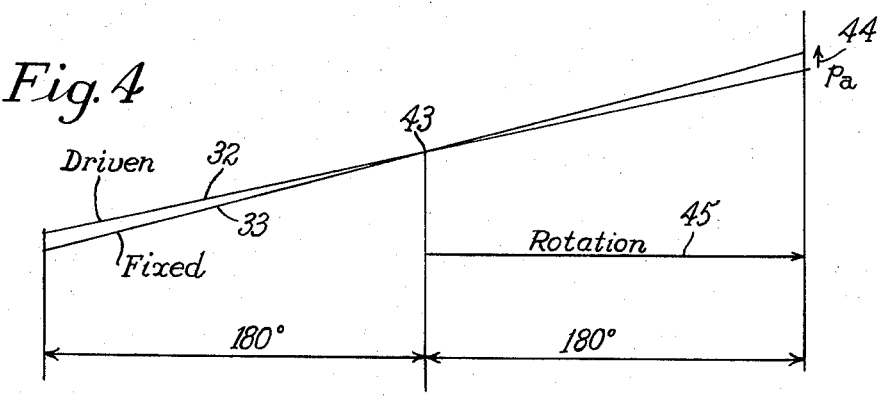
FIGURE 4 is a diagrammatic view illustrating the intersection of two helices, the one on the wedge carrier and the other on the reaction element.

FIGURE 4 shows a helix line 32 for the driven element and a helix line 33 for the fixed element, intersectioning at 180° point 43. The helix line 32 represents the teeth or wedges and the helix line 33 represents the thread-like reaction surfaces. The intersection 43 is along the major axis of the wave generator. Since the difference in number of thread starts or leads per 360° between the helices 32 and 33 is equal to or a multiple of the number of lobes on the wave generator as in my United States Patent No. 2,943,508 above referred to, both ends of the helix lines, or those points which are 180° from the place where the helix lines intercept, are separated by a distance of $P_a$ which is equal to the axial pitch between teeth. This is illustrated by arrow 44. As the intersection point of the helices is rotated through 180° as indicated by the rotation arrow 45, the driven helix would move through an axial distance indicated by the arrow 44 if it were permitted to move axially. The arrow 44 thus represents the axial component.

Figure 5:
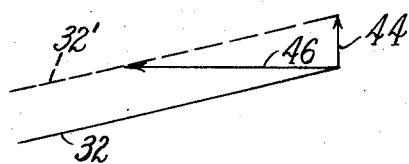
FIGURE 5 is a vector diagram of movement which occurs with reference to FIGURE 4.

In FIGURE 5 the equivalent rotative component 46 is illustrated. Here it can be seen that as the helix angle represented by the teeth or wedges 32 is moved to the position indicated by the dotted line 32′, it can move either along the axial vector line 44 or along the circumferential line 46. Since, however, it is locked against axial motion, and free to rotate, then rotative motion must take place. Therefore, as the intersection point at 43 (FIGURE 4) is rotated through 180° as indicated by rotation line 45, the end point of the helix line 32 in FIGURE 5 will move to the left along the equivalent rotative motion vector line 46 until line 32 will lie on top of line 32′.

The condition illustrated in FIGURES 4 and 5 is that for a helix angle of the thread-like reaction surfaces 33 which is greater than the helix angle of the teeth or wedges 32, which in this case is considered to be the driven element.

Figure 6:
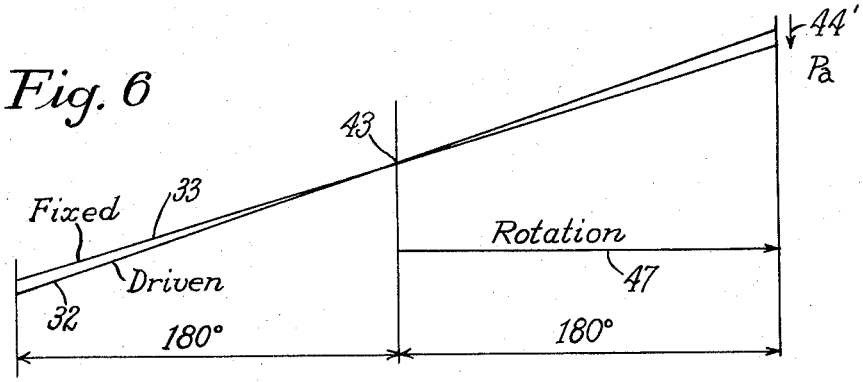
FIGURE 6 is a different representation of the intersection of the two helices, the one on the wedge carrier and the other on the reaction element.

FIGURE 6 is a pictorial representation which is similar except that the teeth or wedges 32 on the driven elements have the larger helix angle and the thread-like reaction surfaces 33 on the fixed element have the smaller helix angle. When arranged in this order, the rotation through 180° indicated by the arrow 47 will also produce an equivalent motion, but it will now be in the opposite direction from that illustrated in FIGURES 4 and 5. In FIGURE 5 the output rotative motion of one helix sliding in relation to the other was in the opposite direction from the input rotation.

Figure 7:
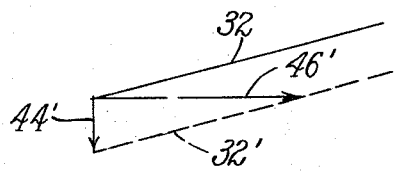
FIGURE 7 is a vector diagram of movement produced with reference to FIGURE 6.

In FIGURE 6 the axial vector 44′ is in the opposite direction and in FIGURE 7 the rotational output vector 46′ is in the same direction as the rotational input.

It can be seen that either direction may be obtained as desired. Since each has its specific set of advantages, the choice of the particular direction depends upon specific conditions. Where the output motion is in the direction opposite to the input the least amount of sliding occurs. However, where the output motion is in the same direction as the input the frictional drag of the input wave generator assists rotation. Thus in one instance the frictional drag of the input is assisting and in the other case it is detracting from the output power.

Figure 8:
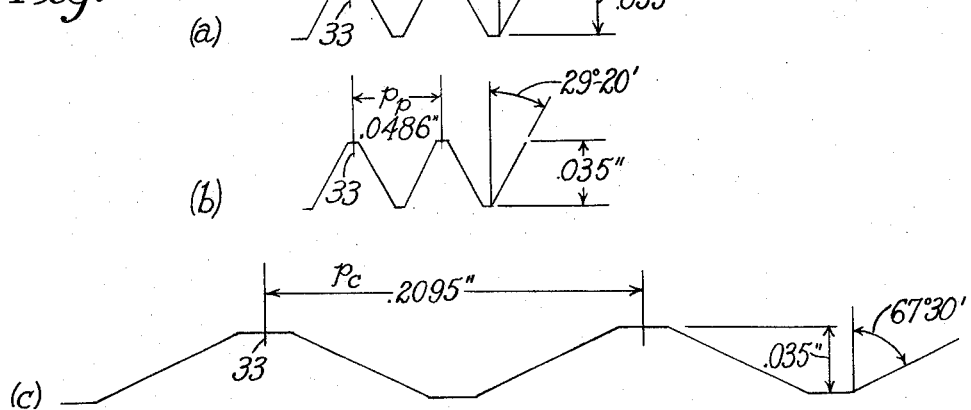
FIGURE 8 is a set of diagrams showing various developed views of the tooth form of the thread-like reaction element.

By way of example, the following set of conditions is assumed:

$D_f$=1.960 inches
$D_s$=2.000 inches
$d$=0.040 inch
$L_f$=32
$p_a$=0.050 inch
$\phi_f$=14° 34 minutes
$\phi_s$=13° 25 minutes Using this set of values, the thread-like reaction surfaces 33 appear as shown in FIGURE 8. In FIGURE 8a these surfaces are shown in axial cross section. The pitch is 0.050 inch, the pressure angle is 30° and the tooth height is 0.035 inch. These values closely approximate those used in a rotary-to-linear actuator. FIGURE 8b shows the section transverse to the helix angle. The tooth height remains the same but the pitch has decreased and so has the pressure angle. When the cross section is directly across the helix, the pitch is at its lowest value. In this specific case it is 0.0486 inch. The pressure angle is also at its lowest value and in this case it is 29 degrees and 20 minutes.

However, when the teeth or thread-like reaction surfaces are viewed in transverse cross section as in FIGURE 8c, the pitch is circumferential and the circular pitch is 0.2095 inch or 4 times as large as the pitch in the axial direction.

FIGURE 8c is a developed view which permits direct comparison. The tooth height remains the same. The pressure angle, however, has increased to 67 degrees 30 minutes. If teeth of this pressure angle were used in a standard harmonic drive rotary-to-rotary device as in my United States Patent No. 2,906,143, the forces, due to the pressure angle, are likely to be completely prohibitive.

Figure 9:
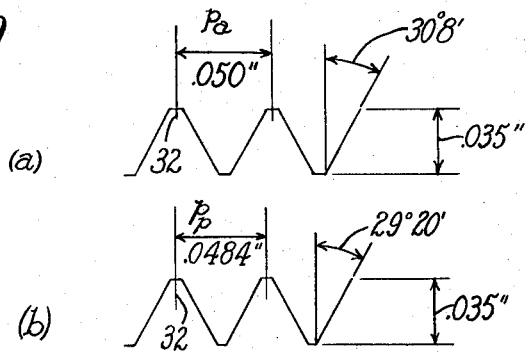
FIGURE 9 is a set of diagrams showing various developed views of the tooth form of the wedge carrier.
Figure 9:
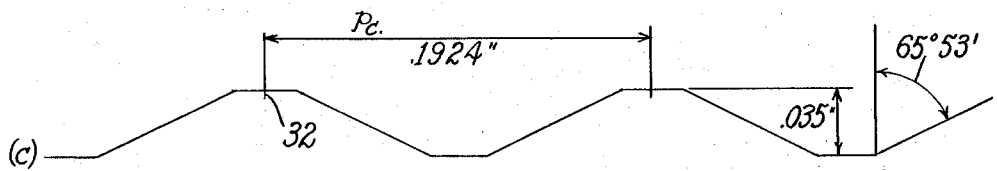

FIGURE 9 shows the same conditions for the teeth or wedges 32. In FIGURE 9a the section taken in the axial direction has teeth which are identical with FIGURE 8 except that the pressure angle in this specific case is 30 degrees 8 minutes, or 8 minutes larger. This pressure angle has been increased so that the contacting angles perpendicular to the helix line will be identical.

Thus, in FIGURE 9b the pressure angle is 29 degrees 20 minutes which is identical to that of FIGURE 8b. This is the actual contacting pressure angle in this example. As this is the working pressure angle and the angle at which the teeth cooperate with each other; it is made the same as the pressure angle on the thread-like surfaces.

FIGURE 9b shows the transverse section perpendicular to the helix line and the pitch in this case is 0.0484 which is slightly less than that in FIGURE 8b. However, it will be noted that in FIGURE 9c the circular pitch is somewhat smaller than that on the fixed reaction surfaces 33, and for this specific example is 0.1924 inch. The pressure angle here is 65 degrees and 53 minutes which is somewhat less than the pressure angle in FIGURE 8c. As a result it will be seen that the teeth in FIGURE 9 will mate perpendicular to the helix line but will not mate when viewed in the axial or circumferential direction.

Careful calculations indicate that the moderate angle of the elliptoid pitch line in relation to the circular pitch line superimposes a second order correction to the mating contact angles. For super precision work or where the initial wear must be kept to a minimum, this should be taken into account. For normal usage, however, it can be disregarded.

Figure 10:
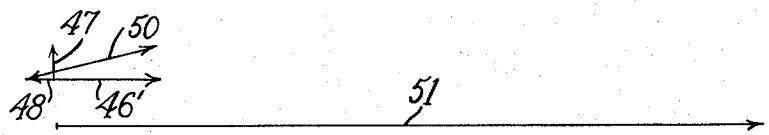
FIGURE 10 is a vector diagram showing the sliding which occurs during operation in a specific example of a device of the invention.

FIGURE 10 is a vector analysis of the motions which take place. It illustrates the amount of sliding which takes place in relation to the wave travel. The radial motion due to the wave progression is illustrated by the vector arrow 47. Line 48 depicts the motion which would occur due to the difference in circumferential length between the flexible wedge carrier and the rigid thread-like reaction elements. Therefore, line 48 represents the distance that the flexible wedge carrier would move in relation to the rigid reaction elements if there were no teeth and one were rolled onto the other. The vector line 46' represents the equivalent circumferential motion. This is the amount of motion depicted by the vector line 46' in FIGURE 7. Hence, the actual motion occurs along the vector line 50. This is the combination of rotating and sliding motion in relation to the travel of the wave as occasioned by the rotation of the wave generator indicated by line 51. The rotative motion as depicted by the vector line 50 is but a small percent of the travel by the line 51. For the specific example given there is only 8 percent sliding, or the length of the vector line 50 is only 8 percent of the vector line 51. Hence, it will be evident that the terms "rolling wedge" are descriptive as to what actually happens.

While the cam surfaces of the wedges are being caused to slide, they are actually sliding on a rolling member so that but a small fraction of their total motion is sliding. This is useful in preventing the slipstick action since the friction will actually be to moving surfaces rather than stationary surfaces and hence will be considerably less than the friction where the motion is 100% sliding.

Figure 11:
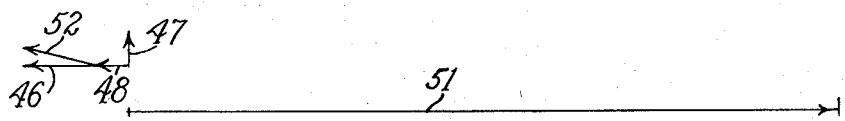
FIGURE 11 is a vector diagram showing the sliding which occurs during operation under a diverse set of specific conditions from that of FIGURE 10.
Figure 12:
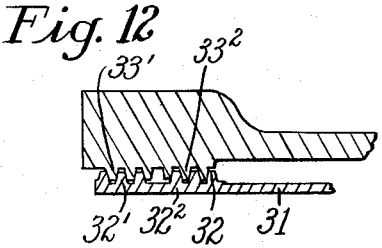
FIGURE 12 is a fragmentary axial section showing the use of herringbone teeth in the device of the invention.

FIGURE 11 shows the same vector diagram except that the helix angle is reversed. Here the equivalent output rotative motion 46 is in the opposite direction to the wave motion. In this case it can be seen that the sliding distance depicted by the vector arrow 52 is actually less than when the output motion is in the same direction as the input motion.

If it is desired to eliminate the axial thrust occasioned by helical teeth, opposed helical teeth or a herringbone pattern will be used. Here the mating wedge surface 32' and 33' are of one hand (right or left hand) and the cooperating mating thread-like surfaces $32^2$ and $33^2$ are of the opposite hand. The cooperating wedge surface and thread-like reaction surfaces are otherwise similar to the other forms.

Figure 13:
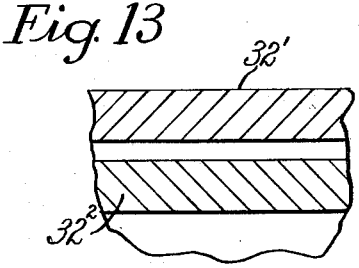
FIGURE 13 is a fragmentary developed view showing the herringbone teeth of FIGURE 12.

FIGURE 13 shows a developed view of the flexible wedge carrier with the wedges 32' and $32^2$ being of opposite hands. It will be seen that this device has balanced axial forces and does not require output thrust bearings.

It should be noted that if the present device is considered from the standpoint only of circumferential motion it may indirectly seem to be similar to the device of my United States Patent No. 2,906,143. While the differences are real, they are somewhat subtle. This patent uses a height of wave $d$, which is commensurate with the motion. Then when the teeth are in contact, they are relatively stationary and the motion is actually produced by a circumferential shift due to the traveling sine wave from rotation of the wave generator. This motion occasioned by the action of non-rigid body mechanics is more fully explained in my United States Patent No. 2,959,065. In the device of the present invention the total height of the wave or the deflection is highly inadequate if it is viewed from the standpoint of circumferential motion. However, it is quite adequate if viewed from the standpoint of a linear actuator.

If one examines the equivalent rotative motion of FIGURES 5 and 7, it appears that the ratio can be expressed as a function of the helix angle of the driven member and the axial pitch. (This assumes a difference in the number of leads to be equal to the number of lobes on the wave generator.) For 180° rotation of the wave generator, the helix intersection will advance $\pi D_f/2$ along the pitch circle circumference of the driven element. This rotationally displaces the driven element circumference by $p_a/\tan \phi_f$. Therefore, the ratio is $$\frac{\pi D_f \tan \phi_f}{2p_a}$$

This calculation can be compared with the ratio from rotary-to-rotary harmonic drive according to my United States Patent No. 2,906,143. This latter ratio is the number of teeth on the driven element divided by the differential in the number of teeth. For the tangent of $\phi_f$, we can substitute $$\frac{\frac{p_a L_f}{2}}{\frac{\pi D_f}{2}}$$

This is equal to the axial pitch multiplied by the number of teeth divided by 2 over ½ of the circumference. When this is substituted for the tangent of $\phi_f$ in the formula above the result is $$\frac{\pi D_f P_a L_f}{2 P_a \pi D_f} = \frac{L_f}{2} = \frac{N_d}{2}$$

where $N_d$ is equal to the number of teeth on the driven element.

In view of the invention and disclosure, variations and modifications to meet individual whim or particular need will doubtless become evident to others skilled in the art to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. In a rolling wedge drive, a flexible tubular wedge carrier having circumferential wedges on one periphery, thread-like reaction elements of different diameter than the wedge carrier, concentric with and cooperating with wedges on the wedge carrier, the forms of the wedges and the thread-like reaction elements being the same, both the wedges and the thread-like elements having a helix angle greater than 10 degrees, and there being a difference in lead between that of the wedges and the thread-like elements, both the wedge carrier and the reaction elements being restrained against moving axially and one of the wedge carrier and the reaction elements being free to rotate, a wave generator operative to deflect the wedge carrier and maintain it deflected into mating engagement between the wedges and the thread-like elements at a plurality of circumferentially spaced lobe positions interspaced by non-mating positions, the difference in the number of leads per 360° between the wedges and the thread-like elements being selected from a class consisting of equality and a multiple of the number of lobes, and means for causing the wave generator to propagate a wave around the periphery of the wedge carrier and cause rotation of one of the wedge carrier and the thread-like reaction elements.

2. A drive of claim 1, in which the pressure angles of the wedges and the thread-like reaction elements transverse to the helix angle are the same.

3. A drive of claim 1, in which the thread-like reaction elements are rotationally stationary.

4. A drive of claim 1, in which the thread-like reaction elements are on the outside and the wedge carrier is on the inside.

5. A drive of claim 1, in which the thread-like reaction elements are on the outside and are rotationally stationary and the wedge carrier is on the inside.

6. A drive of claim 1, in which the helix angles on the wedges and the thread-like reaction elements are numerically different.

7. A drive of claim 6, in which the greater helix angle is on the wedge carrier.

8. A drive of claim 6, in which the thread-like reaction elements have the greater helix angle.

9. A drive of claim 1, in which one of the wedges and the thread-like reaction elements have a multiple lead.

10. A drive of claim 1, in which the wedges and the thread-like reaction elements have helix angles of opposite hand, one right hand and the other left hand.

11. A drive of claim 1, in which there are two lobes on the wave generator.

12. A drive of claim 1, in which the wedge carrier together with the thread-like reaction elements form two axially displaced sets of cooperating wedges and thread-like reaction elements of opposite hand, one right hand and one left hand, the opposed wedges and thread-like reaction elements axially balancing dynamically.

13. In a rolling wedge drive, a flexible wedge carrier having wedges on the outside thereof, thread-like reaction elements surrounding the wedge carrier and inwardly directed, concentric with and cooperating with the wedges on the wedge carrier, the forms of the wedges and the thread-like reaction elements being the same, and both the wedges and the thread-like reaction elements having a helix angle, the thread-like reaction elements being stationary and the wedge carrier being free to rotate but restrained against moving axially, there being a difference in lead between the wedges and the thread-like reaction elements, the helix angles of the wedges and the thread-like reaction elements being greater than 10 degrees, the wedge carrier being held deflected into mating engagement between the wedges and the thread-like reaction elements at two diametrically opposite lobes interspaced by non-mating positions, the difference in the number of threads per 360° between the wedges and the thread-like reaction elements being selected from the class consisting of two and a multiple thereof, the contact between the wedges and the thread-like reaction elements being primarily rolling with additional sliding contact.

14. A drive of claim 13, in which there is a difference in the numerical value of the helix angle on the wedges and the thread-like reaction elements.

15. A drive of claim 14, in which the helix angle on the wedges is greater.

References Cited in the file of this patent
UNITED STATES PATENTS 2,943,509     Botka _____ July 5, 1960
3,039,324     Waterfield _____ June 19, 1962